Patented Aug. 3, 1926.

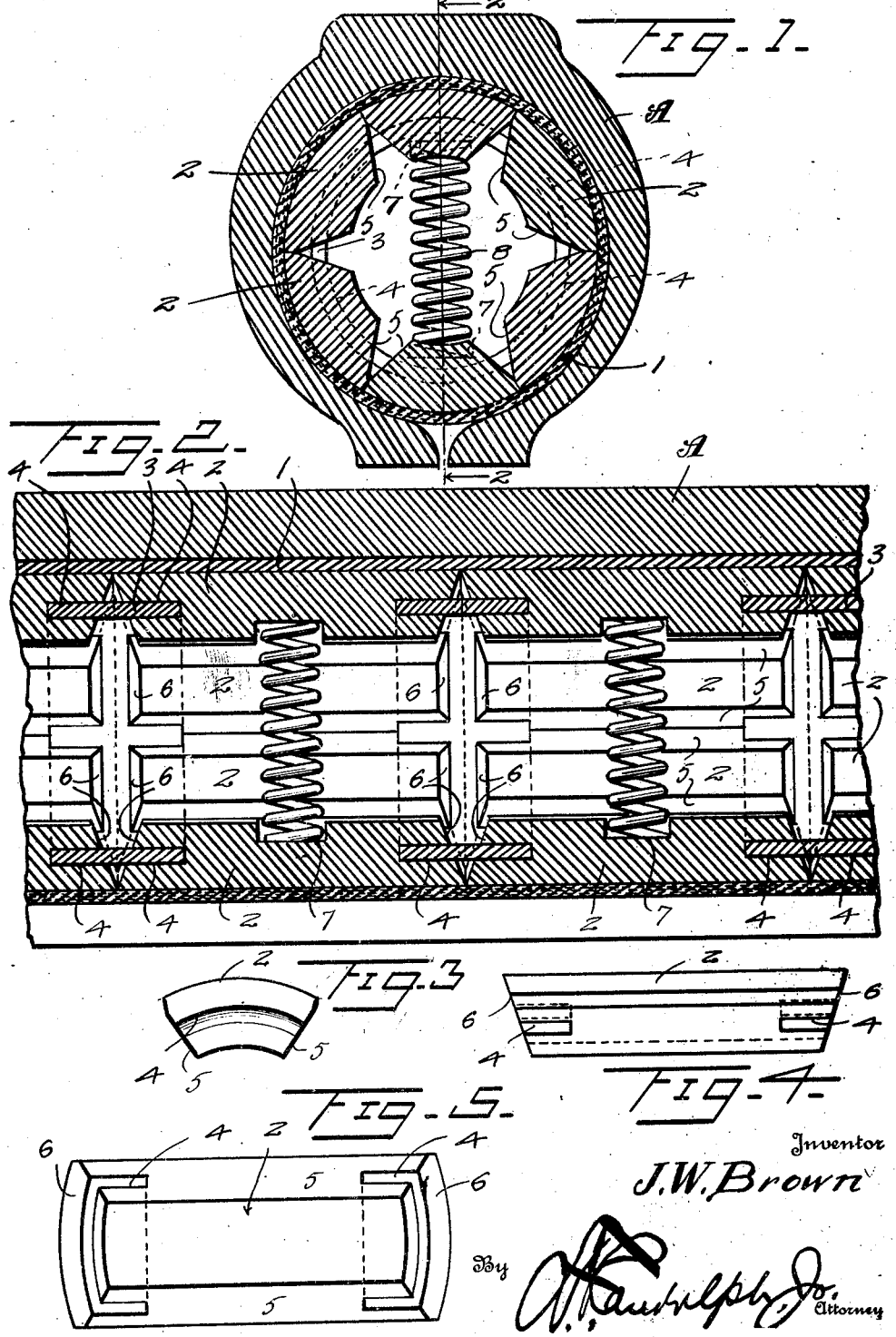

1,594,924

UNITED STATES PATENT OFFICE.

JAMES W. BROWN, OF TULSA, OKLAHOMA.

FILLER FOR VEHICLE TIRES.

Application filed September 19, 1925. Serial No. 57,394.

The invention relates to vehicle tires and has for its object the provision of a filler for the casing ordinarily used in pneumatic tires to dispense with the inflatable inner tube and to substitute therefor a cushioning means comprising a tube containing series of groups of blocks connected together by resilient rings mounted in oppositely disposed grooves in the ends of the blocks, and providing expansible coil springs within the groups to normally expand the groups but permitting limited collapsing of the groups to cushion the tire and to absorb shocks incident to use on the road.

The invention will be described in detail hereinafter and will be found illustrated in the accompanying drawings, in which:

Figure 1 is a transverse sectional view of the tire casing showing the filler contained therein, Figure 2 a fragmental circumferential sectional view on the plane indicated by the line 2—2 of Figure 1, and Figures 3, 4 and 5 detail views of one of the blocks.

In the drawings similar reference characters will be used to designate corresponding parts throughout the several views.

A pneumatic tire casing of conventional type is designated A, and containing the filler to be hereinafter described.

The filler comprises a tube 1 made of any suitable material, and containing groups of blocks 2, the groups being arranged end to end as shown, and connected together by means of rings 3 of resilient material, such as rubber fitting in grooves 4 in the ends of the blocks, said groove in each of the blocks being segmental and in each group of blocks being concentric of the group and of the tube 1, and the grooves of contiguous groups being alined with one another to receive the resilient ring 3.

The sides of each block are beveled inwardly of the group as shown at 5 to permit collapsing of the group to cushion the tire, and the ends of the blocks are provided with inwardly beveled portions 6 to admit of the groups of blocks being arranged in the tire and also to admit of movement of one group of blocks relatively to the other when the tire is in use.

Each of the blocks 2 adjacent the tread of the tire and the block in each group diametrically opposite thereto is provided with a socket 7, and 8 is an expansible coil spring having its ends engaging into said sockets 7 and serving to normally expand the groups of blocks and at the same time permitting the groups of blocks to collapse within certain limits to cushion the tire when in use.

What is claimed is:

1. A filler for vehicle tires comprising a series of resilient members consisting of groups of segmental blocks circumferentially arranged, each of said groups forming a complete ring and resilient rings joining said groups of blocks end to end.

2. A filler for vehicle tires comprising a series of resilient members consisting of groups of segmental blocks circumferentially arranged, the ends of said blocks being provided with segmental grooves resilient rings inserted in said grooves and joining said groups of blocks end to end, and means to expand said groups.

3. A filler for vehicle tires comprising a series of resilient members consisting of groups of segmental blocks circumferentially arranged, each of said blocks having its sides and ends inclined and segmental grooves in its ends, and resilient rings connecting said groups of blocks end to end and mounted in said grooves.

4. A filler for vehicle tires comprising a tubular casing, a series of resilient members consisting of groups of segmental blocks circumferentially arranged within the casing, and rings of resilient material joining contiguous groups of blocks together.

5. A filler for vehicle wheel tires comprising a tubular casing, a series of resilient members consisting of groups of segmental blocks circumferentially arranged within the casing, the blocks in each group having their ends provided with concentric grooves, and rings of resilient material seated in the grooves of contiguous groups.

6. A filler for vehicle wheel tires comprising a tubular casing, a series of resilient members consisting of groups of segmental blocks circumferentially arranged within the casing, the sides and ends of said blocks being beveled, and rings of resilient material joining contiguous groups of blocks together.

7. A filler for vehicle wheel tires comprising a tubular casing, a series of resilient members consisting of groups of segmental blocks circumferentially arranged within the casing, the sides and ends of said blocks being beveled, the blocks in each group having their ends provided with concentric grooves, and rings of resilient material seated in the grooves in contiguous groups.

In testimony whereof I affix my signature.

JAMES W. BROWN.